United States Patent
Jiang et al.

(10) Patent No.: US 10,664,314 B2
(45) Date of Patent: May 26, 2020

(54) CONTAINER DEPLOYMENT METHOD AND APPARATUS

(71) Applicant: HUAWEI TECHNOLOGIES CO., LTD., Shenzhen, Guangdong (CN)

(72) Inventors: Feihu Jiang, Nanjing (CN); Junan Xie, Shenzhen (CN); Ruifeng Hu, Nanjing (CN); Haiyang Ding, Shenzhen (CN); Yaoguo Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 15/887,317

(22) Filed: Feb. 2, 2018

(65) Prior Publication Data
US 2018/0157536 A1   Jun. 7, 2018

Related U.S. Application Data

(63) Continuation of application No. PCT/CN2016/080139, filed on Apr. 25, 2016.

(30) Foreign Application Priority Data

Aug. 6, 2015   (CN) .......................... 2015 1 0475714

(51) Int. Cl.
*G06F 9/50* (2006.01)
*H04L 29/08* (2006.01)

(52) U.S. Cl.
CPC .............. *G06F 9/5005* (2013.01); *G06F 9/50* (2013.01); *G06F 9/5016* (2013.01);
(Continued)

(58) Field of Classification Search
CPC ........ G06F 9/5061; G06F 9/50; G06F 9/5016; G06F 9/5022; G06F 9/5027; G06F 9/5077; G06F 9/5005; H04L 67/10
See application file for complete search history.

(56) References Cited

U.S. PATENT DOCUMENTS

| 9,256,467 B1 * | 2/2016 | Singh ................... G06F 9/5077 |
| 2014/0194081 A1 | 7/2014 | Tohidian et al. |

(Continued)

FOREIGN PATENT DOCUMENTS

CN   103828244 A   5/2014

OTHER PUBLICATIONS

Zhang Zhong-lin et al.,"The docker application based on openstack cloud platform", Software,dated Nov. 30, 2014,total 6 pages.
(Continued)

*Primary Examiner* — Jacob D Dascomb
(74) *Attorney, Agent, or Firm* — Fish & Richardson P.C.

(57) ABSTRACT

A container deployment method and apparatus are disclosed. The method includes receiving a first container creation request that carries a required resource capacity and a required image identifier, where the required image identifier is an identifier of an image corresponding to an application that needs to be run. From a cluster of working nodes, at least two first working nodes whose unused resource capacity is greater than the required resource capacity are selected. A target working node is determined from the at least two working nodes according to images stored on the at least two first working nodes and the required image identifier. A second container creation request is sent to the target working node carrying the required resource capacity and the required image identifier.

9 Claims, 3 Drawing Sheets

(52) U.S. Cl.
CPC .......... *G06F 9/5022* (2013.01); *G06F 9/5027* (2013.01); *G06F 9/5061* (2013.01); *G06F 9/5077* (2013.01); *H04L 67/10* (2013.01)

(56) References Cited

U.S. PATENT DOCUMENTS

| | | |
|---|---|---|
| 2015/0142878 A1 | 5/2015 | Hebert et al. |
| 2015/0150004 A1* | 5/2015 | McGeer .............. G06F 9/45558 718/1 |
| 2018/0157516 A1* | 6/2018 | Kristiansson ......... G06F 9/5027 |

OTHER PUBLICATIONS

Kubernetes release-0.13,Retreived from internet https://github.com/kubernetes/kubernetes/tree/release-0.13/docs, dated Mar. 17, 2015,total 3 pages.

International Search Report issued in International Application No. PCT/CN2016/080139 dated Jul. 19, 2016, 11 pages.

Chinese Office Action issued in Chinese Application No. 201510475714.2 dated Apr. 4, 2019, 9 pages.

\* cited by examiner

CONTAINER DEPLOYMENT METHOD AND APPARATUS

CROSS-REFERENCE TO RELATED APPLICATIONS

This application is a continuation of International Application No. PCT/CN2016/080139, filed on Apr. 25, 2016, which claims priority to Chinese Patent Application No. 201510475714.2, filed on Aug. 6, 2015. The disclosures of the aforementioned applications are hereby incorporated by reference in their entireties.

TECHNICAL FIELD

The present invention relates to the field of Internet technologies, and in particular, to a container deployment method and apparatus.

BACKGROUND

Docker is an open source application container engine, and is based on a kernel lightweight virtualization technology, and can implement resource isolation among applications, configuration and security assurance of each application, and meet a requirement of on-demand resource allocation for each application, isolation among applications and availability of the applications. Before Docker is used to run an application, a corresponding container needs to be created on a working node. Currently, during deployment of a container on the working node, the container is created on a highest-priority working node. Factors that affect container creation include both resource capacity and image, wherein the resource capacity includes a CPU capacity and a memory capacity. Docker images are organized in layers. An image at a lower layer is referred to as a parent image of an image at a current layer, and an image without the parent image is referred to as a base image. However, in a deployment process of the foregoing container, only impact of the resource capacity on the container creation is considered. This may lead to a waste of resources.

SUMMARY

Embodiments of the present invention disclose a container deployment method and apparatus. A container is deployed according to an identifier of a stored image, so that the deployed container uses deployed resources, and resources are reduced.

A first aspect of the embodiments of the present invention discloses a container deployment method, including:

receiving a first container creation request that carries a required resource capacity and a required image identifier, where the required image identifier is an identifier of an image corresponding to an application that needs to be run;

selecting, from a cluster of working nodes, at least two first working nodes whose unused resource capacity is greater than the required resource capacity;

determining, in the at least two first working nodes, a working node as a target working node according to images stored on the at least two first working nodes and the required image identifier; and sending, to the target working node, a second container creation request that carries the required resource capacity and the required image identifier.

With reference to the first aspect of the embodiments of the present invention, in a first possible implementation manner of the first aspect of the embodiments of the present invention, the determining, in the at least two first working nodes, a working node as a target working node according to images stored on the at least two first working nodes and the required image identifier includes:

obtaining an image identifier corresponding to the image stored on each first working node;

determining a working node with the image identifier corresponding to the stored image as the first working node of the required image identifier; and selecting, from the determined first working nodes, a first working node as the target working node.

With reference to the first possible implementation manner of the first aspect of the embodiments of the present invention, in a second possible implementation manner of the first aspect of the embodiments of the present invention, the selecting, from the determined first working nodes, a first working node as the target working node is specifically:

when a quantity of the determined first working nodes is one, determining the determined first working node as the target working node; or when a quantity of the determined first working nodes is greater than one, selecting, from the determined first working nodes, a working node with a smallest unused resource capacity as the target working node.

With reference to the first aspect of the embodiments of the present invention, in a third possible implementation manner of the first aspect of the embodiments of the present invention, the determining, in the at least two first working nodes, a working node as a target working node according to images stored on the at least two first working nodes and the required image identifier includes:

obtaining an image identifier corresponding to the image stored on each first working node;

determining, according to the image identifier corresponding to the stored image, that none of the first working nodes stores the image corresponding to the required image identifier;

obtaining, according to the required image identifier and from a registry repository, image layer identifiers corresponding to image layers included in the image corresponding to the required image identifier;

obtaining image layer identifiers corresponding to image layers stored on each first working node;

determining that there is a first working node in the image layer identifiers corresponding to the stored image layers, where image layer identifiers of the first working node are the same as some image layer identifiers in the image layer identifiers corresponding to the image layers included in the image corresponding to the required image identifier; and selecting, from the determined first working nodes, a first working node as the target working node.

With reference to the third possible implementation manner of the first aspect of the embodiments of the present invention, in a fourth possible implementation manner of the first aspect of the embodiments of the present invention, the selecting, from the determined first working nodes, a first working node as the target working node is specifically:

when a quantity of the determined first working nodes is one, determining the determined first working node as the target working node; or when a quantity of the determined first working nodes is greater than one, selecting, from the determined first working nodes, a working node with a largest quantity of the some image layer identifiers as the target working node.

A second aspect of the embodiments of the present invention discloses a container deployment apparatus, including:

a receiving unit, configured to receive a first container creation request that carries a required resource capacity and a required image identifier, where the required image identifier is an identifier of an image corresponding to an application that needs to be run;

a selection unit, configured to select, from a cluster of working nodes, at least two first working nodes whose unused resource capacity is greater than the required resource capacity;

a determining unit, configured to determine, in the at least two first working nodes, a working node as a target working node according to images stored on the at least two first working nodes and the required image identifier; and a sending unit, configured to send, to the target working node, a second container creation request that carries the required resource capacity and the required image identifier.

With reference to the second aspect of the embodiments of the present invention, in a first possible implementation manner of the second aspect of the embodiments of the present invention, the determining unit includes:

a first obtaining subunit, configured to obtain an image identifier corresponding to the image stored on each first working node;

a first determining subunit, configured to identify all first working nodes, each of which stores an image whose image identifier is the same as the required image identifier; and a first selection subunit, configured to select, from the identified all first working nodes, a first working node as the target working node.

With reference to the first possible implementation manner of the second aspect of the embodiments of the present invention, in a second possible implementation manner of the second aspect of the embodiments of the present invention, the first selection subunit is specifically configured to:

when a quantity of the determined first working nodes is one, determine the determined first working node as the target working node; or when a quantity of the determined first working nodes is greater than one, select, from the determined first working nodes, a working node with a smallest unused resource capacity as the target working node.

With reference to the second aspect of the embodiments of the present invention, in a third possible implementation manner of the first aspect of the embodiments of the present invention, the determining unit includes:

a second obtaining subunit, configured to obtain an image identifier corresponding to the image stored on each first working node;

a second determining subunit, configured to determine, according to the image identifier corresponding to the stored image, that none of the first working nodes stores the image corresponding to the required image identifier;

a third obtaining subunit, configured to obtain, according to the required image identifier and from a registry repository, image layer identifiers corresponding to image layers included in the image corresponding to the required image identifier;

a fourth obtaining subunit, configured to obtain image layer identifiers corresponding to image layers stored on each first working node;

a third determining subunit, configured to determine that there is a first working node in the image layer identifiers corresponding to the stored image layers, where image layer identifiers of the first working node are the same as some image layer identifiers in the image layer identifiers corresponding to the image layers included in the image corresponding to the required image identifier; and a second selection subunit, configured to select, from the determined first working nodes, a first working node as the target working node.

With reference to the third possible implementation manner of the second aspect of the embodiments of the present invention, in a fourth possible implementation manner of the second aspect of the embodiments of the present invention, the second selection subunit is specifically configured to:

when a quantity of the determined first working nodes is one, determine the determined first working node as the target working node; or when a quantity of the determined first working nodes is greater than one, select, from the determined first working nodes, a working node with a largest quantity of the some image layer identifiers as the target working node.

In the embodiments of the present invention, after a first container creation request that carries a required resource capacity and a required image identifier is received, at least two first working nodes whose unused resource capacity is greater than the required resource capacity are selected from a cluster of working nodes, and a working node is determined, in the at least two first working nodes, as a target working node according to images stored on the at least two first working nodes and the required image identifier, and then a second container creation request that carries the required resource capacity and the required image identifier is sent to the target working node. Because a container is deployed on a working node according to an identifier of a stored image, the deployed container uses deployed resources, and resources are reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention disclose a container deployment method and apparatus. A container is deployed according to an identifier of a stored image, so that the deployed container uses deployed resources, and resources are reduced. Details are separately described in the following.

Figure 1:
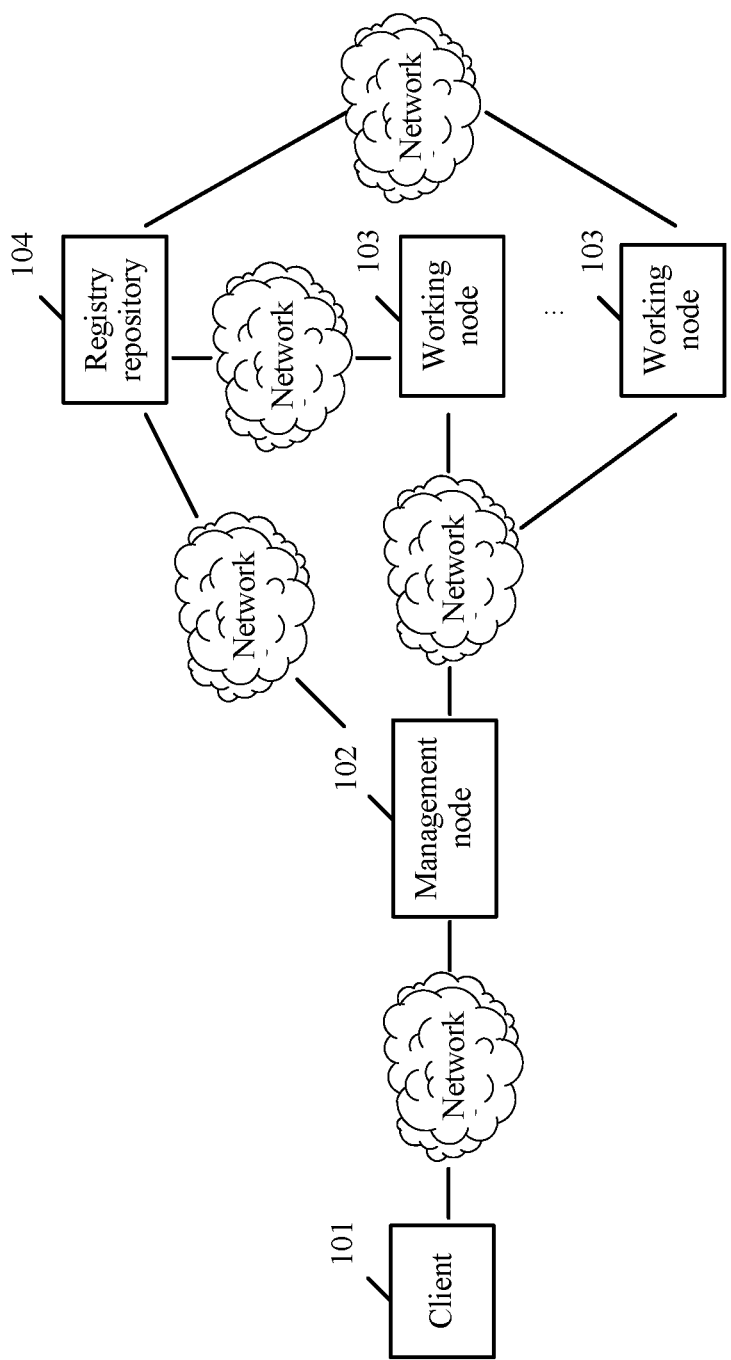
FIG. 1 is a diagram of a container deployment network architecture according to an embodiment of the present invention.

For a better understanding of the container deployment method and apparatus disclosed in the embodiments of the present invention, the following first describes a container deployment network architecture used in the embodiments of the present invention. Referring to FIG. 1, FIG. 1 is a structural diagram of the container deployment network architecture according to an embodiment of the present invention. As shown in FIG. 1, the container deployment network architecture may include a client 101, a management node 102, at least two working nodes 103, and a registry repository 104.

The client 101 is configured to communicate with the management node 102 by using a network, and submit a container creation request. The network may be a local area network, may be the Internet, or may be another network. This is not limited in this embodiment.

The management node 102 is configured to communicate with the client 101 by using the network, and receive the container creation request submitted by the client 101. The management node 102 further specifies, for each container creation request, the working node 103 configured to create a container, communicates with the working node 103 by using the network, instructs the working node 103 to create the container, and obtains an image identifier corresponding to an image stored on the working node 103, image layer identifiers corresponding to image layers stored on the working node 103, a total resource capacity of the working node 103, and a used resource capacity of the working node 103. In addition, the management node 102 may communicate with the registry repository 104 by using the network, and obtain, from the registry repository 104, image layer identifiers corresponding to image layers included in an image corresponding to a required image identifier carried in the container creation request.

The working node 103 is configured to communicate with the management node 102 by using the network, creates the container according to an instruction of the management node 102, and sends information to the management node 102. In addition, the working node 103 communicates with the registry repository 104 by using the network, and obtains, from the registry repository 104, the image or the image layer required for creating the container.

The registry repository 104 is configured to store the image required for creating the container, communicate with the management node 102 by using the network, and send, to the management node 102, the image layer identifier corresponding to the image layer. In addition, the registry repository 104 may communicate with the working node 103 by using the network. When the working node needs to create the container, and the working node 103 does not store the image required for creating the container or stores only some image layers of the image required for creating the container, the working node 103 needs to obtain the image or the image layer from the registry repository 104. The image in the registry repository 104 is produced by an application developer, and is uploaded to the registry repository 104 by an application administrator by using a related interface.

In this embodiment of the present invention, a cluster of working nodes includes all the working nodes 103 in the container deployment network architecture, that is, all the working nodes 103 managed by the management node 102. In this embodiment of the present invention, a first working node is the working node 103 that is in the cluster of the working nodes and whose unused resource capacity is greater than a resource capacity required for creating the container.

Figure 2:
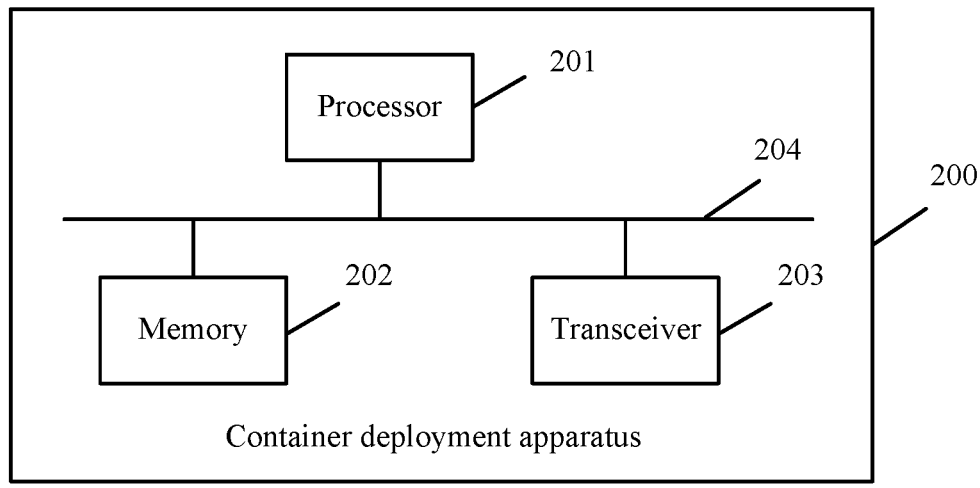
FIG. 2 is a structural diagram of a container deployment apparatus according to an embodiment of the present invention.

Based on the container deployment network architecture shown in FIG. 1, referring to FIG. 2, FIG. 2 is a structural diagram of a container deployment apparatus according to an embodiment of the present invention. The container deployment apparatus may be a management node. As shown in FIG. 2, the container deployment apparatus 200 may include at least one processor 201, for example, a CPU, a memory 202, a transceiver 203, and at least one communications bus 204. The communications bus 204 is configured to implement connection and communication that are between these components. The memory 202 may include a high-speed RAM, or may include a non-volatile memory (non-volatile memory), for example, at least one magnetic disk memory. Optionally, the memory 202 may include at least one storage apparatus away from the processor 201.

The transceiver 203 is configured to receive a first container creation request that carries a required resource capacity and a required image identifier, and send the first container creation request to the processor 201, where the required image identifier is an identifier of an image corresponding to an application that needs to be run.

The memory 202 stores a set of program code, and the processor 201 is configured to call the program code stored in the memory 202 to perform the following operations:

selecting, from a cluster of working nodes, at least two first working nodes whose unused resource capacity is greater than the required resource capacity; and determining, in the at least two first working nodes, a working node as a target working node according to images stored on the at least two first working nodes and the required image identifier.

The transceiver 203 is further configured to send, to the target working node, a second container creation request that carries the required resource capacity and the required image identifier.

In a possible implementation manner, a manner in which the processor 201 determines, in the at least two first working nodes, a working node as the target working node according to the images stored on the at least two first working nodes and the required image identifier is specifically:

obtaining an image identifier corresponding to the image stored on each first working node;

identifying all first working nodes, each of which stores an image whose image identifier is the same as the required image identifier; and selecting, from the determined first working nodes, a first working node as the target working node.

In a possible implementation manner, a manner in which the processor 201 selects, from the determined first working nodes, a first working node as the target working node is specifically:

when a quantity of the determined first working nodes is one, determining the determined first working node as the target working node; or when a quantity of the determined first working nodes is greater than one, selecting, from the determined first working nodes, a working node with a smallest unused resource capacity as the target working node.

In a possible implementation manner, a manner in which the processor 201 determines, in the at least two first working nodes, a working node as the target working node according to the images stored on the at least two first working nodes and the required image identifier is specifically:

obtaining an image identifier corresponding to the image stored on each first working node;

determining, according to the image identifier corresponding to the stored image, that none of the first working nodes stores the image corresponding to the required image identifier;

obtaining, according to the required image identifier and from a registry repository, image layer identifiers corresponding to image layers included in the image corresponding to the required image identifier;

obtaining image layer identifiers corresponding to image layers stored on each first working node;

determining that there is a first working node in the image layer identifiers corresponding to the stored image layers, where image layer identifiers of the first working node are the same as some image layer identifiers in the image layer identifiers corresponding to the image layers included in the image corresponding to the required image identifier; and selecting, from the determined first working nodes, a first working node as the target working node.

In a possible implementation manner, a manner in which the processor 201 selects, from the determined first working nodes, a first working node as the target working node is specifically:

when a quantity of the determined first working nodes is one, determining the determined first working node as the target working node; or when a quantity of the determined first working nodes is greater than one, selecting, from the determined first working nodes, a working node with a largest quantity of the some image layer identifiers as the target working node.

In the container deployment apparatus described in FIG. 2, after a first container creation request that carries a required resource capacity and a required image identifier is received, at least two first working nodes whose unused resource capacity is greater than the required resource capacity are selected from a cluster of working nodes, and a working node is determined, in the at least two first working nodes, as a target working node according to images stored on the at least two first working nodes and the required image identifier, and then a second container creation request that carries the required resource capacity and the required image identifier is sent to the target working node. Because a container is deployed on a working node according to an identifier of a stored image, the deployed container uses deployed resources, and resources are reduced.

Figure 3:
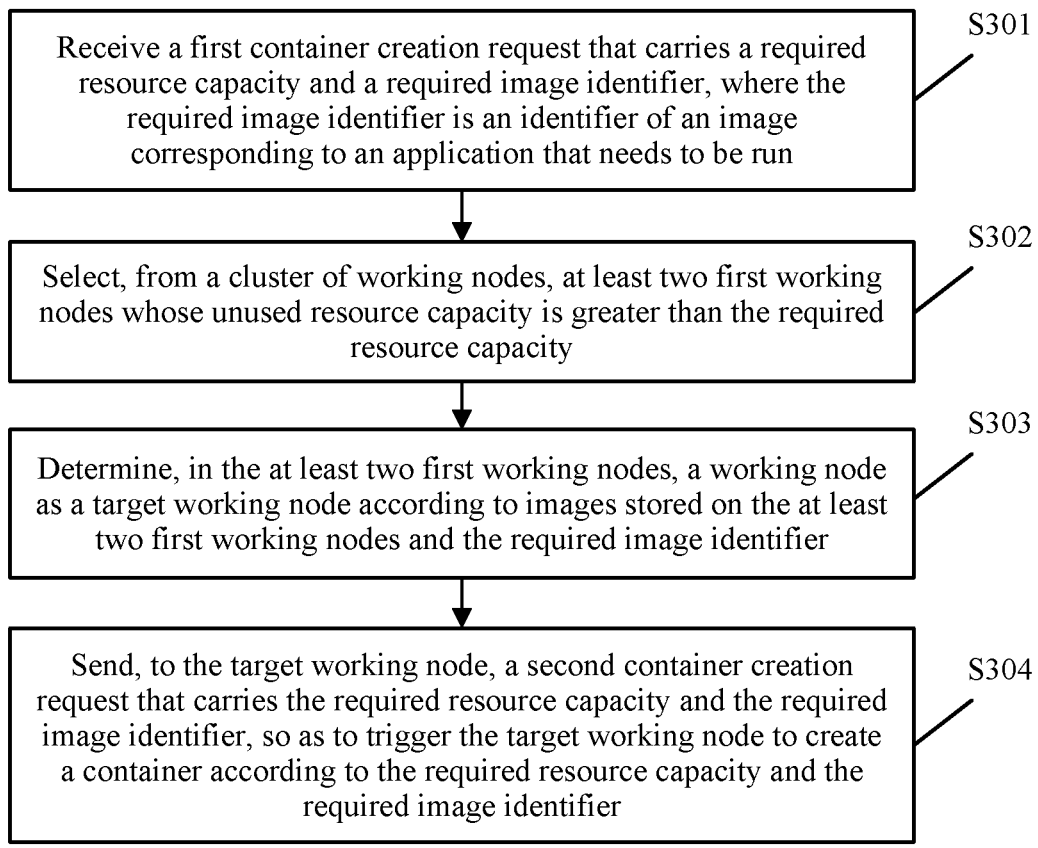
FIG. 3 is a flowchart of a container deployment method according to an embodiment of the present invention.

Based on the container deployment network architecture shown in FIG. 1, an embodiment of the present invention discloses a container deployment method. Referring to FIG. 3, FIG. 3 is a flowchart of the container deployment method according to this embodiment of the present invention. The container deployment method may be performed by a management node. As shown in FIG. 3, the container deployment method may include the following steps.

S301. Receive a first container creation request that carries a required resource capacity and a required image identifier, where the required image identifier is an identifier of an image corresponding to an application that needs to be run.

In this embodiment, when the application needs to be run on a working node, a corresponding container first needs to be created on the working node. Therefore, when a user needs to run the application, the user may input, by operating a keyboard, a mouse, a push button, and the like and to a client, a container creation instruction including the identifier of the image corresponding to the application that needs to be run and the resource capacity required for creating the container. After receiving the container creation instruction, the client parses the container creation instruction, generates a first container creation request, and sends the first container creation request to the management node. Alternatively, when a client needs to run the application, the client generates a first container creation request that includes the required resource capacity and the required image identifier, and sends the first container creation request to the management node. The required image identifier is the identifier of the image corresponding to the application that needs to be run; and the required resource capacity may include a required CPU capacity and a required memory (memory) capacity.

S302. Select, from a cluster of working nodes, at least two first working nodes whose unused resource capacity is greater than the required resource capacity.

In this embodiment, after receiving the first container creation request that carries the required resource capacity and the required image identifier, the management node selects, from the cluster of the working nodes, the at least two first working nodes whose unused resource capacity is greater than the required resource capacity. That is, the unused resource capacity of each working node in the cluster of the working nodes is compared with the required resource capacity. When the unused resource capacity of the working node is greater than the required resource capacity, it indicates that the unused resource capacity of the working node can meet the required resource capacity. Therefore, the working node is used as the first working node.

In this embodiment, the management node may obtain, by using a network, in advance a used resource capacity and a total resource capacity that are of each working node in the cluster of the working nodes; or may obtain, by using a network, a used resource capacity and a total resource capacity that are of each working node in the cluster of the working nodes after receiving the first container creation request. This is not limited in this embodiment. After obtaining the used resource capacity and the total resource capacity that are of each working node in the cluster of the working nodes, the management node may obtain the unused resource capacity of the working node by subtracting the used resource capacity of the working node from the total resource capacity of the working node. The unused resource capacity of the working node may include an unused CPU capacity and an unused memory capacity. After receiving the first container creation request or obtaining the unused resource capacity of each working node, the management node compares the unused CPU capacity of each working node with the required CPU capacity, and compares the unused memory capacity of the working node with the required memory capacity. When the unused CPU capacity of the working node is greater than the required CPU capacity, and the unused memory capacity of the working node is greater than the required memory capacity, the working node is used as the first working node.

In this embodiment, when the used resource capacity and the total resource capacity that are of the working node are obtained in advance by the management node, the used resource capacity and the total resource capacity may be actively obtained by the management node, or may be actively sent by the working node to the management node. This is not limited in this embodiment. When the used resource capacity and the total resource capacity that are of the working node are obtained in advance by the management node, if the used resource capacity of the working node changes, the management node updates an unused resource capacity that is stored and that is of the working node; or when the used resource capacity and the total resource capacity that are of the working node are actively sent by the working node to the management node, if the used resource capacity of the working node changes, the working node sends an update message to the management node. When the used resource capacity and the total resource capacity that are of the working node are obtained by the management node after the first container creation request is received, the used resource capacity and the total resource capacity are actively obtained by the management node.

In this embodiment, the management node may actively obtain the used resource capacity and the total resource capacity that are of the working node in an HTTP request manner. A request message of the management node may be in the following format:

```
GET /resources
A response message is carried by using JSON over HTTP.
Content-Type: application/josn
Defined JSON syntax:
{
"Resources": {
    "total_CPU": int //A CPU capacity of a node
    "total_CPU": int //A memory capacity of a node
}
}
Example:
{
"Resources": {
    "total_CPU": 4
    "total_memory": 64
}
}
```

When the used resource capacity and the total resource capacity that are of the working node are obtained in advance by the management node by using the network, after the used resource capacity and the total resource capacity that are of each working node are obtained, the unused resource capacity of each working node is obtained by means of calculation, and then resource capacities of these working nodes are stored, and when the used resource capacity of the working node changes, the resource capacity that is stored and that is of the working node is updated for subsequent use. A table in which the management node stores CPU capacities and memory capacities of these working nodes may be shown in Table 1.

TABLE 1

A CPU capacity and a memory capacity that are stored and that are of a working node

|  | Node 1 | Node 2 | Node 3 | . . . |
|---|---|---|---|---|
| total_CPU | 4 | 8 | 4 | . . . |
| total_Memory | 64 | 128 | 64 | . . . |

S303. Determine, in the at least two first working nodes, a working node as a target working node according to images stored on the at least two first working nodes and the required image identifier.

In a possible implementation manner, a manner in which the working node is determined, in the at least two first working nodes, as the target working node according to the images stored on the at least two first working nodes and the required image identifier is specifically:

obtaining an image identifier corresponding to the image stored on each first working node;

identifying all first working nodes, each of which stores an image whose image identifier is the same as the required image identifier; and selecting, from the identified all first working nodes, a first working node as the target working node.

In a possible implementation manner, a manner in which the first working node is selected, from the determined first working nodes, as the target working node is specifically:

when a quantity of the determined first working nodes is one, determining the determined first working node as the target working node; or when a quantity of the determined first working nodes is greater than one, selecting, from the determined first working nodes, a working node with a smallest unused resource capacity as the target working node.

In a possible implementation manner, a manner in which the working node is determined, in the at least two first working nodes, as the target working node according to the images stored on the at least two first working nodes and the required image identifier is specifically:

obtaining an image identifier corresponding to the image stored on each first working node;

determining, according to the image identifier corresponding to the stored image, that none of the first working nodes stores the image corresponding to the required image identifier;

obtaining, according to the required image identifier and from a registry repository, image layer identifiers corresponding to image layers included in the image corresponding to the required image identifier;

obtaining image layer identifiers corresponding to image layers stored on each first working node;

determining that there is a first working node in the image layer identifiers corresponding to the stored image layers, where image layer identifiers of the first working node are the same as some image layer identifiers in the image layer identifiers corresponding to the image layers included in the image corresponding to the required image identifier; and selecting, from the determined first working nodes, a first working node as the target working node.

In a possible implementation manner, a manner in which the first working node is selected, from the determined first working nodes, as the target working node is specifically:

when a quantity of the determined first working nodes is one, determining the determined first working node as the target working node; or when a quantity of the determined first working nodes is greater than one, selecting, from the determined first working nodes, a working node with a largest quantity of the some image layer identifiers as the target working node.

In this embodiment, after selecting, from the cluster of the working nodes, the at least two first working nodes whose unused resource capacity meets the required resource capacity, the management node obtains the image identifier corresponding to the image stored on each first working node, and determines whether an image identifier in the image identifiers corresponding to images stored on a first working node is the same as the required image identifier, so as to determine whether a first working node in the at least two first working node stores the image corresponding to the required image identifier. When an image identifier in the image identifiers corresponding to images stored on each first working node is the same as the required image identifier, that is, when a first working node stores the image corresponding to the required image identifier, the first working node is determined out of the at least two first working nodes, where one of the image identifiers corresponding to the images stored on the first working node is the same as the required image identifier. When the quantity of the determined first working nodes is one, the first working node is used as the target working node; or when the quantity of the determined first working nodes is greater than one, the working node with the smallest unused resource capacity in the determined first working nodes may be used as the target working node, or a working node with a largest unused resource capacity in the determined first working nodes may be used as the target working node, or the working node may be selected from the determined first working node as the target working node in another manner. This is not limited in this embodiment. When the working node with the smallest unused resource capacity in the determined first working nodes is used as the target working node, a container may be created on the working node with the smallest unused resource capacity, and a working node with a relatively large unused resource capacity may be configured to subsequently create a container with a relatively large required resource capacity.

In this embodiment, when none of the image identifiers corresponding to images stored on each first working node is the same as a required image identifier, that is, when no first working node stores an image corresponding to the required image identifier, a management node sends, to a registry repository, an image layer identifier obtaining request that carries the required image identifier, so that the registry repository sends, to the management node, image layer identifiers corresponding to image layers included in the image corresponding to the required image identifier. In addition, the management node obtains image layer identifiers corresponding to image layers stored on each first working node; and then compares image layer identifiers corresponding to image layers stored on each first working node with image layer identifiers corresponding to image layers included in the image corresponding to the required image identifier, so as to determine whether some image layers in the image layers included in the image corresponding to the required image identifier are stored on the at least two first working nodes. When some image layer identifiers in image layer identifiers corresponding to image layers stored on the first working node are the same as some image layer identifiers in the image layer identifiers corresponding to the image layers included in the image corresponding to the required image identifier, that is, when a first working node stores the some image layers in the image layers included in the image corresponding to the required image identifier, the first working node is determined in the at least two working nodes, where the some image layer identifiers in image layer identifiers corresponding to image layers stored on the at least two working nodes are the same as the some image layer identifiers in the image layer identifiers corresponding to the image layers included in the image corresponding to the required image identifier. When a quantity of the determined first working nodes is one, the first working node is used as a target working node; or when a quantity of the determined first working nodes is greater than one, a working node with a largest quantity of the some image layer identifiers in the determined first working nodes may be used as a target working node, or a working node with a largest capacity of the image layers corresponding to the some image layer identifiers may be used as a target working node, or a working node may be selected from the determined first working nodes as a target working node in another manner. This is not limited in this embodiment. When the working node with the largest quantity of the some image layer identifiers in the determined first working nodes is used as the target working node, a quantity of image layers that need to be obtained from the registry repository is smallest when the target working node creates a container; or when the working node with the largest capacity of the image layers corresponding to the some image layer identifiers is used as the target working node, a capacity of the image layers that needs to be obtained from the registry repository is smallest when the target working node creates a container, so that a container creation rate can be increased.

In this embodiment, when none of the first working nodes stores the image corresponding to the required image identifier, and none of the first working nodes stores the some image layers in the image layers included in the image corresponding to the required image identifier, the management node may select, from the at least two first working nodes, the working node with the largest unused resource capacity as the target working node, or may select, from the at least two first working nodes, the working node with the smallest unused resource capacity as the target working node, or may select, from the at least two first working nodes, a working node as the target working node in another manner. This is not limited in this embodiment.

In this embodiment, the management node may obtain in advance an image identifier and image layer identifiers that are respectively corresponding to an image and image layers that are stored on each first working node in the at least two first working nodes, or may obtain, by using the network, an image identifier and image layer identifiers that are respectively corresponding to an image and image layers that are stored on some or all of the first working nodes in the at least two first working nodes after receiving the first container creation request. This is not limited in this embodiment. A quantity of the images stored on each first working node may be zero, may be one, or may be an integer greater than one. This is not limited in this embodiment. One image may include one image layer, or may include multiple image layers. This is not limited in this embodiment. Therefore, a quantity of the image layers stored on each first working node may be zero, may be one, or may be an integer greater than one. This is not limited in this embodiment.

In this embodiment, when an image identifier and image layer identifiers that are respectively corresponding to an image and image layers that are stored on the working node are obtained in advance by the management node, the image identifier and the image layer identifiers may be actively obtained by the management node, or may be actively sent by the working node to the management node. This is not limited in this embodiment. When the image identifier and the image layer identifiers are actively obtained by the management node, if the image stored on the working node changes, the management node updates the image identifier and the image layer identifiers that are stored and that are respectively corresponding to the image and the image layers that are stored on the working node; or when the image identifier and the image layer identifiers are actively sent by the working node to the management node, if the image stored on the working node changes, the working node sends an update message to the management node. When the image identifier and the image layer identifiers that are respectively corresponding to an image and image layers that are stored on the working node are obtained by the management node after the first container creation request is received, the image identifier and the image layer identifiers are actively obtained by the management node.

In this embodiment, when an image identifier and image layer identifiers that are respectively corresponding to an image and image layers that are stored on the working node are obtained by the management node after the first container creation request is obtained, the image identifier and the image layer identifiers that are respectively corresponding to an image and image layers that are stored on each working node in the cluster of the working nodes may be obtained immediately after the first container creation request is obtained; or the image identifier and the image layer identifiers that are respectively corresponding to an image and image layers that are stored on each first working node may be obtained, or the image identifier corresponding to the image stored on each first working node may be first obtained after the at least two first working nodes whose unused resource capacity meets the required resource capacity are selected from the cluster of the working nodes. When a first working node stores the image corresponding to the required image identifier, there is no need to obtain image layer identifiers corresponding to image layers stored on each first working node; or when no first working node stores the image corresponding to the required image identifier, image layer identifiers corresponding to image layers stored on each first working node need to be obtained. The management node may obtain, by using an image manager on the management node, an image identifier and image layer identifiers that are respectively corresponding to an image and image layers that are stored on the working node.

In this embodiment, the management node may actively obtain, in an HTTP request manner, an image identifier and image layer identifiers that are respectively corresponding to an image and image layers that are stored on the working node. An HTTP request message may be in the following format:

```
GET /images/all/layers
A response message is carried by using JSON over HTTP.
Content-Type: application/josn
Defined JSON syntax:
{
   "ImagesLayersID": [
[string, ...], //It indicates a unique identifier of each layer of
an image.
...
]
}
Example:
{
   "ImagesLayersID": [
[aa0abbcccddd bbcc222fffcc ddeeefff99aa], //It indicates a
unique identifier of each layer of an image, and aa0abbcccdds is
a unique identifier of a top layer of an image, that is, the unique
identifier of the image.
[gg0abbcccddd bbcc222fffcc bbeeefff99aa],
[ee0abbcccddd ffcc222fffcc ggeeefff99aa hheee333aaaa]
]
}
```

In this embodiment, when the working node actively sends, to the management node, an image identifier and image layer identifiers that are respectively corresponding to an image and image layers that are stored, the working node may notify the management node in an HTTP manner. An HTTP notification message may be in the following format:

```
PUT /images/all/layers
The notification message is carried by using JSON over HTTP.
Content-Type: application/josn
Defined JSON syntax:
{
   "ImagesLayersID": [
[string, ...], //It indicates a unique identifier of each layer of an image.
...
]
}
Example:
{
   "ImagesTreesID": [
[aa0abbcccddd bbcc222fffcc ddeeefff99aa],
[gg0abbcccddd bbcc222fffcc bbeeefff99aa],
[ee0abbcccddd ffcc222fffcc ggeeefff99aa hheee333aaaa]
]
}
The response message may be in the following format:
HTTP/1.1 200
```

When the image identifier and the image layer identifiers that are stored on the working node that are respectively corresponding to an image and image layers that are stored on the working node are obtained in advance by the management node by using the network, after obtaining an image identifier and image layer identifiers that are respectively corresponding to an image and image layers that are stored on the working node, the management node may store these image identifiers and image layer identifiers. When the image stored on the working node changes, the management node may update the image identifier and the image layer identifiers that are stored and that are respectively corresponding to the image and the image layers that are stored on the working node for subsequent use. A table in which the management node stores an image identifier and image layer identifiers that are respectively corresponding to an image and image layers that are stored on the working node may be shown in Table 2.

TABLE 2

An image identifier and image layer identifiers that are stored and that are of a working node

| Node 1 | Node 2 | Node 3 | ... |
|---|---|---|---|
| [aa0abbcccddd bbcc222fffcc ddeeefff99aa] | [gg0abbcccddd bbcc222fffcc bbeeefff99aa] | [aa0abbcccddd bbcc222fffcc ddeeefff99aa] | ... |
| [gg0abbcccddd bbcc222fffcc bbeeefff99aa] | [ee0abbcccddd ffcc222fffcc ggeeefff99aa hheee333aaaa] | N/A | ... |
| [ee0abbcccddd ffcc222fffcc ggeeefff99aa hheee333aaaa] | N/A | N/A | |

S304. Send, to the target working node, a second container creation request that carries the required resource capacity and the required image identifier, so as to trigger the target working node to create a container according to the required resource capacity and the required image identifier.

In this embodiment, after determining, in at least two first working nodes, a working node as a target working node according to images stored on the at least two first working nodes and a required image identifier, a management node sends, to the target working node, a second container creation request that carries a required resource capacity and the required image identifier, so as to trigger the target working node to create a container according to the required resource capacity and the required image identifier, so that an application corresponding to the required image identifier is run on the target working node.

In this embodiment, a management node may periodically select a target image from images stored on a cluster of working nodes, and send, to some or all working nodes that store the target image, a purge instruction that carries an image identifier corresponding to the target image, so as to trigger the working node that receives the purge instruction to purge the stored target image corresponding to the image identifier, thereby reducing storage resources of the working node. The target image is an image that is not used within a preset time length, or one of images stored on at least two working nodes.

In the container deployment method described in FIG. 3, after a first container creation request that carries a required resource capacity and a required image identifier is received, at least two first working nodes whose unused resource capacity is greater than the required resource capacity are selected from a cluster of working nodes, and a working node is determined, in the at least two first working nodes, as a target working node according to images stored on the at least two first working nodes and the required image identifier, and then a second container creation request that carries the required resource capacity and the required image identifier is sent to the target working node. Because a container is deployed on a working node according to an identifier of a stored image, the deployed container uses deployed resources, and resources are reduced.

Figure 4:
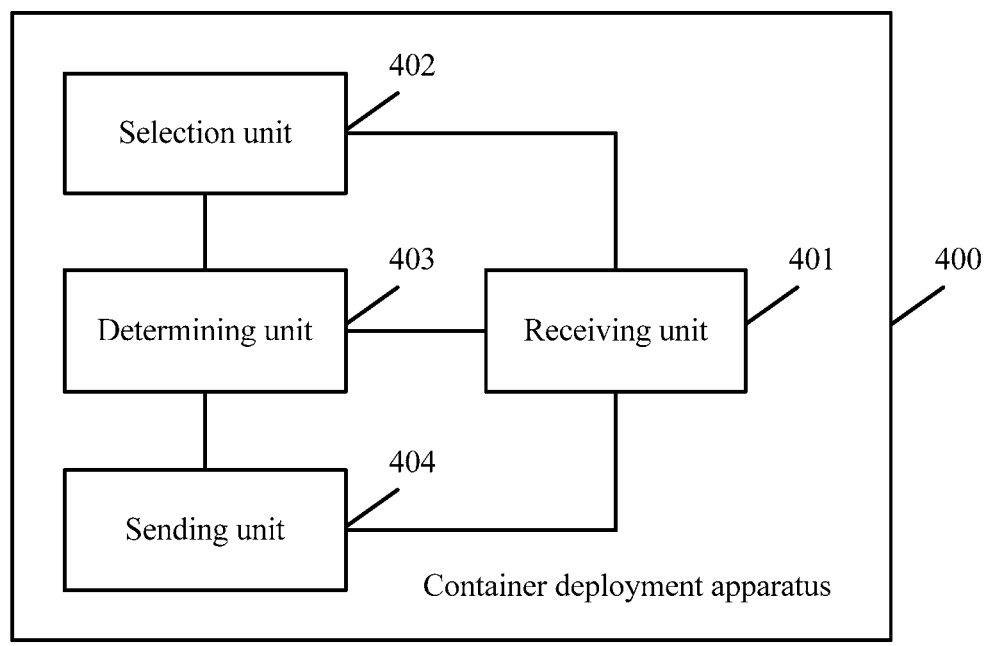
FIG. 4 is a structural diagram of another container deployment apparatus according to an embodiment of the present invention.

Based on the container deployment network architecture shown in FIG. 1, an embodiment of the present invention discloses a container deployment apparatus. Referring to FIG. 4, FIG. 4 is a structural diagram of another container deployment apparatus according to this embodiment of the present invention. The container deployment apparatus may be a management node. As shown in FIG. 4, the container deployment apparatus 400 may include:

a receiving unit 401, configured to receive a first container creation request that carries a required resource capacity and a required image identifier, where the required image identifier is an identifier of an image corresponding to an application that needs to be run;

a selection unit 402, configured to select, from a cluster of working nodes, at least two first working nodes whose unused resource capacity is greater than the required resource capacity carried in the first container creation request received by the receiving unit 401;

a determining unit 403, configured to determine, in the at least two first working nodes selected by the selection unit 402, a working node as a target working node according to images stored on the at least two first working nodes selected by the selection unit 402 and the required image identifier carried in the first container creation request received by the receiving unit 401; and a sending unit 404, configured to send, to the target working node determined by the determining unit 403, a second container creation request that carries the required resource capacity carried in the first container creation request received by the receiving unit 401 and the required image identifier carried in the first container creation request received by the receiving unit 401, so as to trigger the target working node to create a container according to the required resource capacity and the required image identifier.

In a possible implementation manner, the determining unit 403 may include:

a first obtaining subunit, configured to obtain an image identifier corresponding to the image stored on each first working node;

a first determining subunit, configured to identify all first working nodes, each of which stores an image whose image identifier is the same as the required image identifier; and a first selection subunit, configured to select, from the identified all first working nodes, a first working node as the target working node.

In a possible implementation manner, the first selection subunit is specifically configured to:

when a quantity of the determined first working nodes is one, determine the determined first working node as the target working node; or when a quantity of the determined first working nodes is greater than one, select, from the determined first working nodes, a working node with a smallest unused resource capacity as the target working node.

In a possible implementation manner, the determining unit 403 may include:

a second obtaining subunit, configured to obtain an image identifier corresponding to the image stored on each first working node;

a second determining subunit, configured to determine, according to the image identifier corresponding to the stored image, that none of the first working nodes stores the image corresponding to the required image identifier;

a third obtaining subunit, configured to obtain, according to the required image identifier and from a registry repository, image layer identifiers corresponding to image layers included in the image corresponding to the required image identifier;

a fourth obtaining subunit, configured to obtain image layer identifiers corresponding to image layers stored on each first working node;

a third determining subunit, configured to determine that there is a first working node in the image layer identifiers corresponding to the stored image layers, where image layer identifiers of the first working node are the same as some image layer identifiers in the image layer identifiers corresponding to the image layers included in the image corresponding to the required image identifier; and a second selection subunit, configured to select, from the determined first working nodes, a first working node as the target working node.

In a possible implementation manner, the second selection subunit is specifically configured to:

when a quantity of the determined first working nodes is one, determine the determined first working node as the target working node; or when a quantity of the determined first working nodes is greater than one, select, from the determined first working nodes, a working node with a largest quantity of the some image layer identifiers as the target working node.

In the container deployment apparatus described in FIG. 4, after a first container creation request that carries a required resource capacity and a required image identifier is received, at least two first working nodes whose unused resource capacity is greater than the required resource capacity are selected from a cluster of working nodes, and a working node is determined, in the at least two first working nodes, as a target working node according to images stored on the at least two first working nodes and the required image identifier, and then a second container creation request that carries the required resource capacity and the required image identifier is sent to the target working node. Because a container is deployed on a working node according to an identifier of a stored image, the deployed container uses deployed resources, and resources are reduced.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, and an optical disc.

The foregoing describes in detail the container deployment method and apparatus disclosed in the embodiments of the present invention. In this specification, specific examples are used to illustrate a principle and an implementation manner that are of the present invention, and description of the foregoing embodiments is merely intended to help understand the method and a core idea that are of the present invention. In addition, a person of ordinary skill in the art makes modifications with respect to a specific implementation manner and an application scope according to the idea of the present invention. In conclusion, content of this specification shall not be construed as a limitation on the present invention.

What is claimed is:

1. A container deployment method, comprising:
    receiving a first container creation request that carries a required resource capacity and a required image identifier, wherein the required image identifier is an identifier of an image corresponding to an application that needs to be run;
    selecting, from a cluster of working nodes, at least two first working nodes, wherein an unused resource capacity of each of the at least two first working nodes is greater than the required resource capacity;
    determining, from the at least two first working nodes, a target working node according to images stored on the at least two first working nodes and the required image identifier; and
    sending, to the target working node, a second container creation request that carries the required resource capacity and the required image identifier,
    wherein the determining, from the at least two first working nodes, the target working node according to images stored on the at least two first working nodes and the required image identifier comprises:
        obtaining an image identifier corresponding to each image stored on each of the at least two first working nodes;
        determining, according to the image identifier corresponding to each image, that none of the at least two first working nodes stores an image corresponding to the required image identifier;
        obtaining, according to the required image identifier and from a registry repository, image layer identifiers corresponding to image layers comprised in the image corresponding to the required image identifier;
        obtaining image layer identifiers corresponding to image layers stored on each of the at least two first working nodes;
        determining that there is at least one third working node in the image layer identifiers corresponding to the stored image layers, wherein image layer identifiers of each of the at least one third working node are the same as one or more image layer identifiers in the image layer identifiers corresponding to the image layers comprised in the image corresponding to the required image identifier; and
        selecting, from the determined at least one third working node, the target working node.

2. The method according to claim 1, wherein the selecting, from the determined at least one third working node, the target working node comprises:
    if a quantity of the determined at least one third working node is one, determining the determined at least one third working node as the target working node; or
    if a quantity of the determined at least one third working node is greater than one, selecting, from the determined at least one third working node, a working node with a largest quantity of the one or more image layer identifiers as the target working node.

3. The method of claim 1 wherein the required resource capacity includes at least one of a required CPU capacity or a required memory capacity.

4. The method of claim 1 wherein the required resource capacity includes a required CPU capacity and a required memory capacity.

5. The method of claim 1 wherein the selecting, from a cluster of working nodes, at least two first working nodes, comprises comparing the unused resource capacity of each of the at least two working nodes with the required resource capacity.

6. The method of claim 5 wherein the selecting, from a cluster of working nodes, at least two first working nodes, further comprises determining, based on the comparing, that the unused resource capacity of each of the at least two working nodes can meet the required resource capacity.

7. The method of claim 1 including determining the unused resource capacity of each of the at least two working nodes, wherein determining the unused resource capacity includes subtracting a used resource capacity of a respective one of the working nodes from a total resource capacity of the respective one of the working nodes.

8. The method of claim 1 wherein the sending, to the target working node, a second container creation request triggers the target working node to create a container according to the required resource capacity and the required image identifier.

9. The method of claim 8 wherein creation of the container according to the required resource capacity and the required image identifier allows the application to be run on the target working node.

* * * * *